United States Patent [19]
Abe et al.

[11] 3,971,569
[45] July 27, 1976

[54] SAFETY SEAT BELT DEVICE WITH AN INFLATABLE CUSHIONING MEANS

[75] Inventors: Fumiyuki Abe, Yokohama; Syuichi Otani, Tokyo, both of Japan

[73] Assignee: Nissan Motor Company Limited, Yokohama, Japan

[22] Filed: Feb. 19, 1974

[21] Appl. No.: 443,618

[30] Foreign Application Priority Data
Feb. 21, 1973 Japan.................................. 48-20188

[52] U.S. Cl............................... 280/733; 180/82 C; 280/747; 297/386
[51] Int. Cl.²......................................... B60R 21/08
[58] Field of Search................ 280/150 AB, 150 SB, 280/150 B; 297/386, 388, 389; 180/82 C

[56] References Cited
UNITED STATES PATENTS

| | | | |
|---|---|---|---|
| 2,859,048 | 11/1958 | Munn | 280/150 AB |
| 3,028,200 | 4/1962 | Dye | 297/389 |
| 3,680,883 | 8/1972 | Keppel | 280/150 SB |
| 3,682,498 | 8/1972 | Rutzki | 280/150 AB |
| 3,703,313 | 11/1972 | Schiesterl | 280/150 AB X |
| 3,770,078 | 11/1973 | Keppel | 297/388 X |
| 3,777,840 | 12/1973 | Botnick | 297/388 X |
| 3,801,156 | 4/1974 | Granig | 297/386 |
| 3,804,435 | 4/1974 | See | 280/150 AB |
| 3,819,197 | 6/1974 | Shakespear | 280/150 SB |

FOREIGN PATENTS OR APPLICATIONS

| | | | |
|---|---|---|---|
| 1,902,793 | 8/1970 | Germany | 280/150 AB |
| 1,944,821 | 3/1971 | Germany | 280/150 AB |
| 2,032,148 | 1/1972 | Germany | 280/150 AB |

*Primary Examiner*—M. H. Wood, Jr.
*Assistant Examiner*—John P. Silverstrim

[57] ABSTRACT

A safety seat belt device suitable for motor vehicles, railway coaches, aeroplanes, speedboats and the like, including shoulder and lap belts which are automatically movable between an occupant restraining position and an easy-to-enter position in relation with closing and opening operation of a vehicle door or operating conditions of the vehicle, and an inflatable cushioning means which is adapted to expand between the shoulder belts and a vehicle occupant in the event of an abnormal sudden deceleration of the vehicle as in a collision or similar harzardous accidents.

4 Claims, 4 Drawing Figures

SAFETY SEAT BELT DEVICE WITH AN INFLATABLE CUSHIONING MEANS

This invention relates to a safety seat belt device with an inflatable cushioning means particularly suitable for motor vehicles, railway coaches, aeroplanes and speedboats.

It is well known in the art to provide on a vehicle seat a vehicle occupant restraining seat belt system including shoulder and lap belts each having one end fixed to a rigid vehicle structure and the other end movably supported on a retractor or other suitable means for moving the belts between an easy-to-enter position and an occupant restraining position in relation with opening and closing of the vehicle body door. It is also known in the art to provide an inflatable device such as an air bag at a suitable position on the vehicle structure so that the air bag is expanded between an interior rigid vehicle structure and the seated occupant for giving cushioning effects on the occupant in the event of a collision or other incidence involving a sudden deceleration as would throw the occupant violently forwardly from his seat.

In order to give a most effective protection on a vehicle occupant under the normal driving conditions as well as during a sudden deceleration as in a collision, it is desirable to provide the occupant restraining seat belt system in combination with an inflatable cushioning or shock-absorbing means like an air bag system.

The instant invention contemplates to provide a safety seat belt device which is combined in a suitable and advantageous manner with an inflatable shock-absorbing device, preferably, in the form of an air bag.

In the existing air bag systems, the air bag is usually provided independently from the restraining seat belt system and is designed to expand in a space between an interior rigid vehicle structure and a vehicle occupant. One of the difficulties encountered with such air bag system is that, particularly on a motor vehicle, the space is often limited to ensure a sufficient collision energy absorbing stroke (a distance required by an air bag for absorbing collision energy between a rigid interior vehicle structure and the occupant), resulting in less protective effects on the vehicle occupant. A difficulty with existing fixed type vehicle occupant restraining belts is that they require troublesome fastening and unfastening operations and are therefore not used in most cases.

It is the primary object of the present invention to provide a safety seat belt device incorporating an inflatable cushioning means in such a manner to give assured protective effects on a vehicle occupant in the event of a sudden deceleration of the vehicle.

It is another object of the present invention to provide a safety seat belt device incorporating belt driving means for automatically moving the restraining belts between an easy-to-enter position and an occupant restraining position in relation with opening and closing operation of a vehicle body door.

It is still another object of the present invention to provide a safety seat belt device employing an air bag which is expanded between yoke type shoulder belts and chest portions of a vehicle occupant in the event of an abnormal sudden deceleration of the vehicle.

It is a further object of the present invention to provide a safety seat belt device which is secure in operation and operative automatically without requiring efforts on the part of the vehicle occupant.

In one preferred form of the invention, there is provided a safety seat belt device which is suitable for use on a vehicle including a vehicle body interiorly having an occupant compartment and an occupant seat mounted on a floor of the occupant compartment and accessible through a vehicle body opening which is selectively opened and closed by a vehicle body door. The safety seat belt device essentially comprises in combination yoke type shoulder belts having upper ends thereof secured to a belt retractor which is movable along a longitudinal track on a roof of said occupant compartments; a lap belt having one end secured to said vehicle compartment floor at an inner side of said occupant seat and the other end secured to an anchor which is movable along a diagonally disposed track on an inner wall of said vehicle body door; lower ends of said shoulder belts being secured to said lap belt at a space from each other; a first driving means mounted on said vehicle compartment roof for moving said retractor between a rearmost position and a foremost position on said longitudinal track; a second driving means mounted on said vehicle body door for moving said anchor between a rearmost position and a foremost position on said diagonally disposed track; a door switch connected to said first and second driving means for actuating the same to move in forward and reverse directions in relation with opening and closing operations of said vehicle body door thereby to bring said shoulder and lap belts to an easy-to-center positions upon opening of said vehicle body door and to an occupant restraining positions upon closing said vehicle body door; and an air bag means fixedly mounted on said lap belts between the lower ends of said shoulder belts and actuatable upon detection of an abnormal deceleration by means of a sensor mounted on a vehicle body structure.

The above and other objects, features and advantages of the invention will become apparent from the following description and the appended claims, taken in conjunction with the accompanying drawings which show by way of example a preferred embodiment of the invention and wherein:

Figure 1:
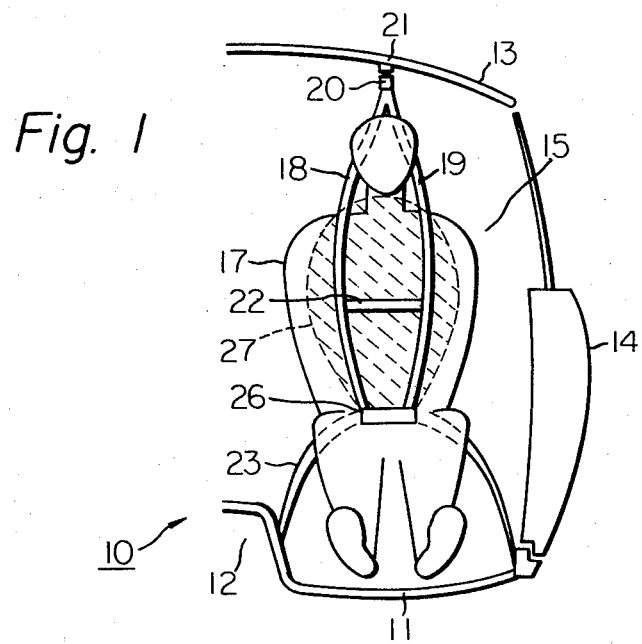
FIG. 1 is a diagrammatic front view of a portion of a vehicle incorporating the safety seat belt device according to the present invention with the shoulder and lap belts and the cushioning means shown in the respective occupant restraining and cushioning positions.

Referring to the drawings, a vehicle which is generally indicated at 10 includes a usual vehicle body with a conventional vehicle body floor 11 with a transmission tunnel 12, a vehicle body roof 13 and a vehicle body door 14, defining an occupant compartment 15. A vehicle seat 16 is mounted within the occupant compartment 15 in the conventional manner. Access to the occupant compartment is had by way of a vehicle body door opening which is opened and closed by the vehicle body door 14.

As shown in FIG. 1, a vehicle occupant 17 is restrained in the seated position by means of a safety seat belt device according to the present invention which includes yoke type shoulder belts 18 and 19 extending longitudinally along the chest of the occupant on opposite sides of his head for restraining his upper body portions.

Figure 2:
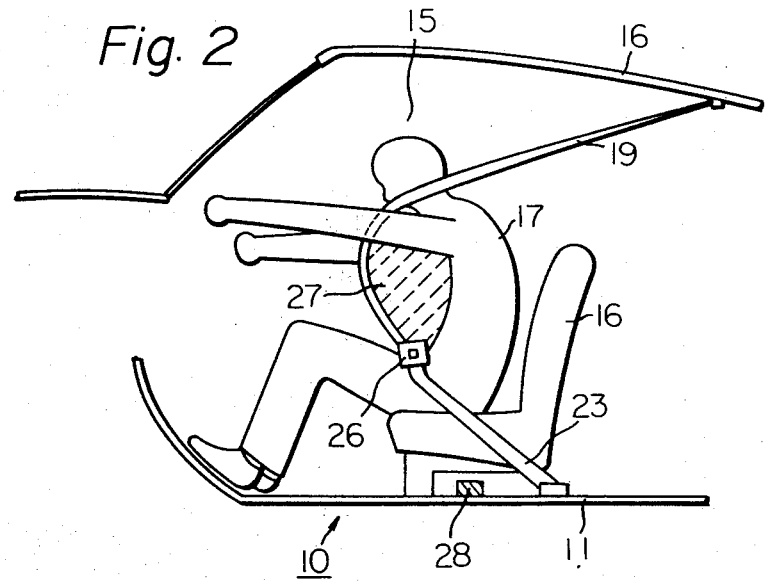
FIG. 2 is a diagrammatic side view showing the same device as shown in FIG. 1.

The upper ends of the shoulder belts 18 and 19 are fixed together to a belt retractor 20 which is mounted on the vehicle body roof 13 movably along a longitudinal track or rail 21. The shoulder belts 18 and 19 on the chest of the occupant 17 is connected at a suitable space from each other by means of a transverse connecting strap 22. The spaced lower ends of the shoulder belts 18 and 19 are secured to a lap belts 23 which extends taut across the lap of the occupant 17 in the occupant restraining position as shown in FIGS. 1 and 2. One end of the lap belt 23 is fixed by a bracket or other suitable means to the vehicle body floor 11. The other or outer end of the lap belt 23 is fixedly supported on an anchor 24 which is movable along a diagonally disposed track or rail 25 on the inner wall surface of the vehicle body door 14, the rear end of the track or rail 25 terminating at a level lower than the fore end thereof.

Fixedly mounted on the lap belt 23 between the spaced lower ends of the shoulder belts 18 and 19 is an inflatable cushioning means 26 which may be an air bag of the conventional construction and which has normally a reduced volume as shown by a solid line but is adapted to be expanded into a larger volume as indicated by hatching 27 in FIGS. 1 and 2 in response to a control signal from a deceleration sensor 28 detecting an abnormal deceleration in the event, for example, of a vehicle collision.

Normally, in the absence of an abnormal deceleration, the vehicle occupant 17 is restrained in the seated position as shown in FIGS. 1 and 2 by means of the shoulder and lap belts 18, 19 and 23 with the air bag 26 in a deflated condition.

In case of the vehicle 10 experiencing a sudden deceleration as in a collision, this is detected by the sensor 28 to ignite a gas-generating agent in gas generator (not shown) of the inflatable means 26 for expanding the same between the safety belt system and the occupant as shown by hatching 27 in FIGS. 1 and 2.

The air bag expanded between the shoulder belts 18, 19 and the vehicle occupant 11 serves to prevent the shoulder belts 18 and 19 from imposing localized pressures on the chest, shoulder and abdominal portions of the occupant and at the same time to prevent excessive forward inclination of the vehicle occupant's head by supporting the same on the upper end portion of the expanded air bag.

With the conventional air bag system with the air bag mounted on and expanded from a structural part of the vehicle, it is difficult to give effective protection on the vehicle occupant immediately in the initial stage of a collision when the occupant is thrown violently forwardly from his seat. This difficulty is, however, suitably eliminated as the shoulder belt is tensioned upon expansion of the air bag, restraining the vehicle occupant in the seated position as early as in the initial stage of the collision.

In order to expand as quickly as possible the conventional air bag 26 which is mounted on a vehicle body structure, it is necessary to increase the expansion velocity of the bag. However, the increase of the expansion velocity imposes a serious effect on the strength of the air bag per se. Moreover, the protective effect of the conventional air bag varies with the body size and the posture of the seated occupant. This drawback is absent in the present invention wherein the air bag itself is fitted on the occupant body so that it can give assured protective effect from the initial stage of the expansion without being influenced by the body size or posture of the vehicle occupant.

Figure 3:
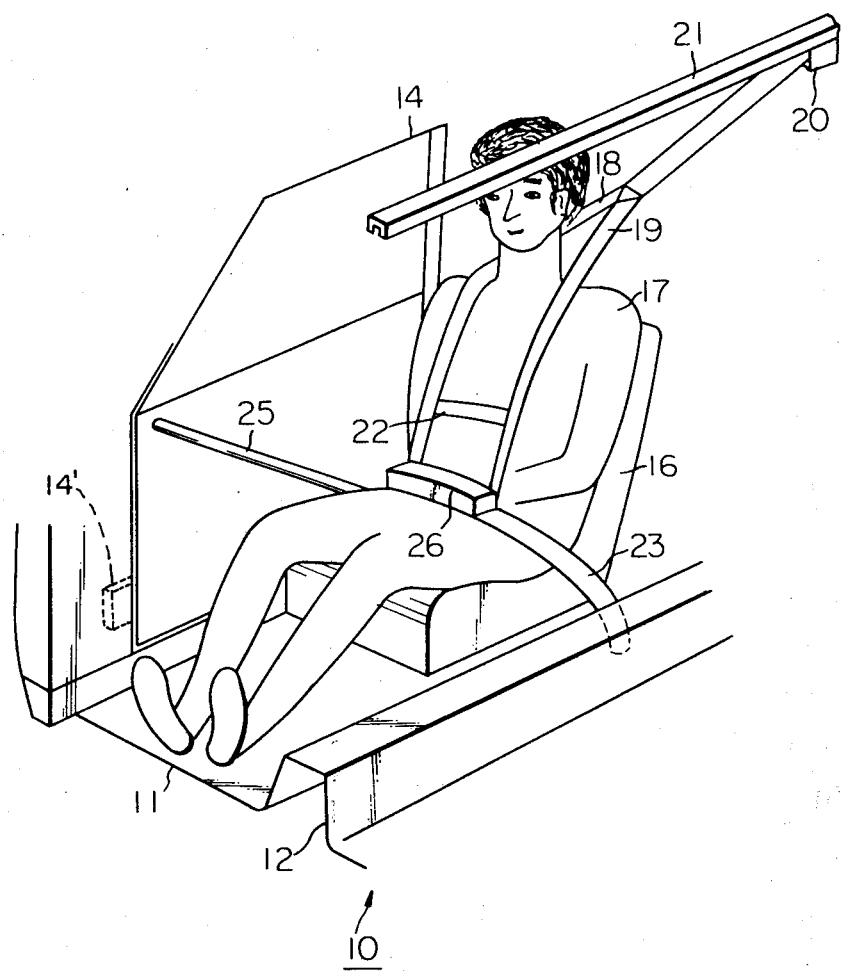
FIG. 3 is a diagrammatic perspective view of a portion of the vehicle with the belts held in the occupant restraining positions by means of respective belt driving means.
Figure 4:
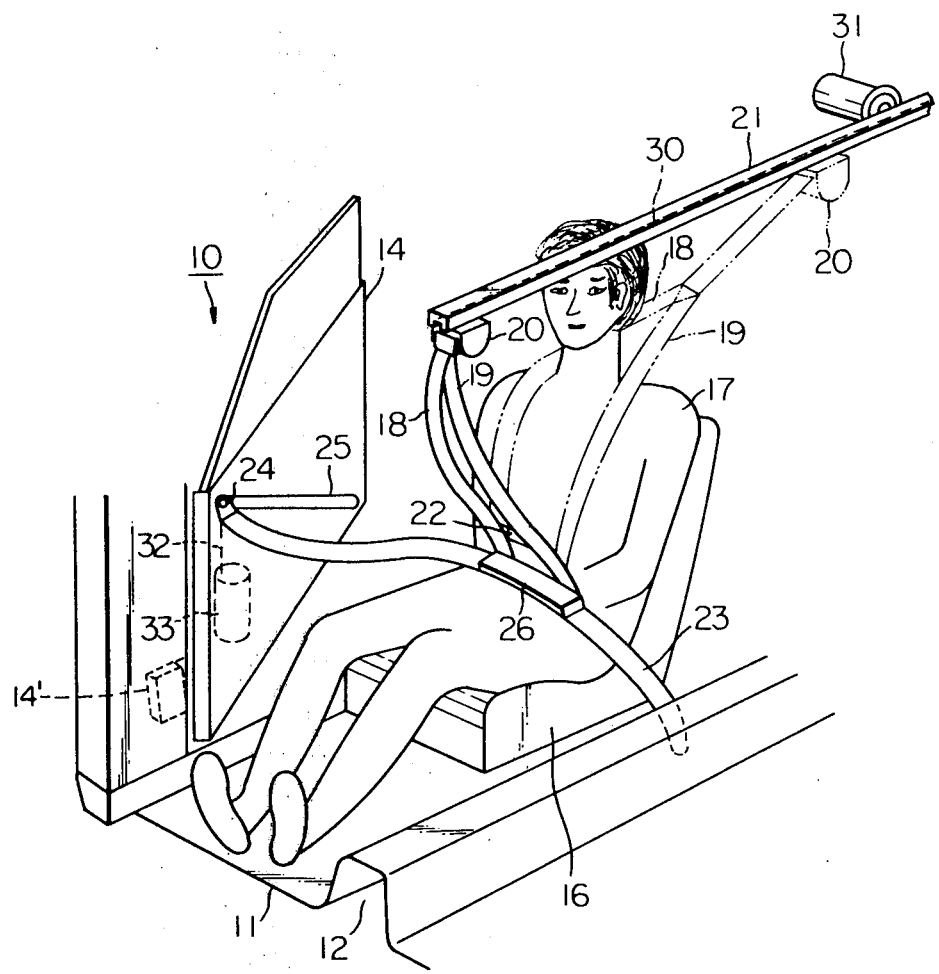
FIG. 4 is a view similar to FIG. 3 but with vehicle body door and the belts in open and closed positions, respectively.

FIGS. 3 and 4 show mechanisms for operating the belt system between the occupant restraining position and the easy-to-enter position. In the present invention, the shoulder and lap belts 18, 19 and 23 are held in the occupant restraining position when the vehicle body door 14 is closed as in FIG. 3 and in the easy-to-enter position when the vehicle body door 14 is opened as in FIG. 4, without requiring any effort on the part of the vehicle occupant 17.

As mentioned hereinbefore, the upper ends of the shoulder belts 18 and 19 are secured to a conventional inertia retractor 20 which is movable along the longitudinal rail 21 on the vehicle body roof 13. The retractor 20 is moved between the rearmost position of FIG. 3 and the foremost position of FIG. 4 by means of a rack rail which is indicated by a broken line 30 and which is driven from a motor 31. Similarly, the outer end of the lap belt 23 is fixedly supported on an anchor 24 which is movable along the diagonally disposed track or rail 25 on the vehicle body door 14. The anchor 24 is moved between the rearmost position of FIG. 3 and the foremost position of FIG. 4 by means of a rack wire which is also indicated by a broken line at 32 and driven from a motor 33. In FIGS. 1 to 4, similar parts are designated by similar reference numerals.

In order to move the shoulder and lap belts 18, 19 and 23 to and from the respective easy-to-enter positions of FIG. 4 and the occupant restraining positions of FIG. 3, in relation with the opening and closing operations of the vehicle body door 14, the motors 31 and 33 are connected to a door switch 14 which is adapted to rotate the motors in the forward direction to bring the retractor 20 and the anchor 24 to the respective foremost positions of FIG. 4 upon opening the door 14 and to rotate the motors 32 and 33 in the reverse direction to bring the retractor 20 and the anchor 24 to the rearmost restraining positions of FIG. 3 upon closing the door 14.

A vehicle occupant enters the vehicle through the vehicle door opening with the door in an open position and the shoulder and lap belts 18, 19 and 23 held in the easy-to-enter positions by mmeans of the driving means 32 and 33 as shown in FIG. 4. In this instance, the retractor 20 and the anchor 24 are also in the respective foremost positions on the rails 21 and 25. When the occupant assumes a seated position, the occupant's head is passed though the V-shaped loop of the shoulder belts 18 and 19 with the lap belt 23 on his lap. Upon closing the vehicle body door 14, the door switch actuates the motors 31 and 33 rearwardly for moving the retractor 20 and the anchor 24 to the rearmost positions of FIG. 3 from the foremost positions of FIG. 3, respectively. Since the anchor 24 is lowered to the rearmost position on the rail 25, it is brought into a taut condition on the lap of the occupant 17. On the other hand, the retractor 20 in its rearmost positions on the rail 21 on the vehicle body roof retracts the shoulder belts 18 and 19 to maintain the same also in a taut condition. Thus, both the lap and shoulder belts are positioned in the occupant restraining positions of FIG. 3 without requiring any effort on the part of the occupant.

When the occupant 17 opens the vehicle body door 14 to get off the vehicle, the door switch actuates the motors 31 and 33 to rotate in the forward direction for shifting the anchor 24 and the retractor 20 to the respective easy-to-enter positions on the rails 21 and 25, respectively, as shown in FIG. 4. The occupant is thus allowed to leave the vehicle upon opening the vehicle body door 14.

The invention thus provides an improved safety seat belt device which is capable of restraining a seated occupant automatically in response to closure of the vehicle body door 14 without requiring any effort on the side of the vehicle occupant and of protecting the vehicle occupant by means of an air bag when a sudden deceleration occurs to the vehicle as in a collision.

What is claimed is:

1. A safety seat belt device for use in a motor vehicle having a floor and a roof cooperably defining an occupant compartment in which an occupant seat is mounted on said floor, said safety seat belt device comprising:
   a lap belt having one end secured inward of said seat to said floor and the other end adapted to be held outward of said seat;
   a yoke type shoulder belt including first and second belts, said first and second belts respectively having upper ends thereof adapted to be held at said roof, lower ends thereof secured to said lap belt at transversely spaced positions;
   air bag means fixedly mounted on said lap belt between the lower ends of said first and second belts so that upon collision of said motor vehicle, an air bag of said air bag means is expanded toward said upper ends of said first and second belts; and
   a transverse connecting strap transversely arranged between respective lower portions of said first and second belts so that upon expansion of said air bag of the air bag means, said transverse connecting strap holding, in combination with said first and second belts, the expanded air bag between said transverse connecting strap and a torso portion of a seated occupant.

2. A safety seat belt device according to claim 1, in which the upper ends of said first and second belts are combined into one belt which is secured to a belt retractor movable along an elongated track longitudinally disposed on said roof, said retractor being actuated to move between a rearmost position and a foremost position of said track by means of driving means.

3. A safety seat belt device according to claim 2, in which the other end of said lap belt is secured to an anchor which is actuated to move between a rearmost position and a foremost position on an elongated track diagonally disposed on a door wall by means of another driving means.

4. A safety seat belt device according to claim 3, in which said driving means adapted for moving said retractor and said another driving means adapted for moving said anchor and actuated by means responsive to door opening and door closing.

* * * * *